(12) United States Patent
Salarian et al.

(10) Patent No.: US 12,542,801 B2
(45) Date of Patent: Feb. 3, 2026

(54) DYNAMIC PRIORITIZATION OF ATTACK PATHS IN CLOUD NATIVE APPLICATION

(71) Applicant: Cisco Technology, Inc., San Jose, CA (US)

(72) Inventors: Arash Salarian, Vaud (CH); Marcelo Yannuzzi, Canton de Fribourg (CH); Hendrikus G.P. Bosch, Aalsmeer (NL); Jeffrey Michael Napper, Delft (NL)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 18/470,884

(22) Filed: Sep. 20, 2023

(65) Prior Publication Data

US 2025/0097252 A1  Mar. 20, 2025

(51) Int. Cl.
H04L 29/00 (2006.01)
H04L 9/40 (2022.01)

(52) U.S. Cl.
CPC .................. H04L 63/1433 (2013.01)

(58) Field of Classification Search
CPC ............. H04L 63/1433; H04L 63/143
See application file for complete search history.

(56) References Cited

U.S. PATENT DOCUMENTS

| | | | |
|---|---|---|---|
| 2017/0026401 A1* | 1/2017 | Polyakov | H04L 63/20 |
| 2020/0177617 A1* | 6/2020 | Hadar | G06F 21/552 |
| 2020/0177619 A1* | 6/2020 | Hadar | H04L 63/1433 |
| 2020/0296137 A1* | 9/2020 | Crabtree | H04L 63/1433 |
| 2020/0296138 A1* | 9/2020 | Crabtree | H04L 63/1425 |
| 2020/0389495 A1* | 12/2020 | Crabtree | G06F 16/9024 |
| 2020/0412767 A1* | 12/2020 | Crabtree | H04L 63/1441 |
| 2021/0019674 A1* | 1/2021 | Crabtree | G06V 30/274 |
| 2021/0120012 A1 | 4/2021 | Jang et al. | |
| 2021/0168175 A1* | 6/2021 | Crabtree | G06F 16/951 |
| 2021/0352100 A1* | 11/2021 | Barai | H04L 63/1416 |

(Continued)

OTHER PUBLICATIONS

"Cloud Native Application Protection Platform", retrived at https://www.wiz.io/solutions/cnapp on Jul. 21, 2023, Wiz, 10 pages.

(Continued)

Primary Examiner — Don G Zhao
(74) Attorney, Agent, or Firm — Lee & Hayes, P.C.

(57) ABSTRACT

Techniques for using real-time metrics and telemetry information to dynamically prioritize attack paths identified during a static analysis of a cloud native application, and using top priority attack paths identified during the static analysis to steer the dynamic analysis. The techniques may include identifying components of the cloud native application and connections between the components. The components and connections are analyzed to identify a set of attack paths. Network communications are monitored between the connections and metrics representing signals in the communications collected. A first subset of the attack paths based on a first portion of the metric indicating a real-time security vulnerability are identified. Finally, the first subset of the attack paths is prioritized over a second subset of the attack paths based at least in part on the first subset having the first portion of the metrics indicating real-time security vulnerabilities.

20 Claims, 5 Drawing Sheets

(56) References Cited

U.S. PATENT DOCUMENTS

| | | | | |
|---|---|---|---|---|
| 2021/0360032 | A1* | 11/2021 | Crabtree | H04L 63/20 |
| 2022/0014560 | A1* | 1/2022 | Crabtree | H04L 63/1425 |
| 2022/0014561 | A1* | 1/2022 | Caceres | H04L 63/1425 |
| 2022/0078210 | A1* | 3/2022 | Crabtree | G06F 16/9024 |
| 2022/0159033 | A1 | 5/2022 | Mizrahi et al. | |
| 2022/0201042 | A1* | 6/2022 | Crabtree | G06F 16/2477 |
| 2022/0210200 | A1* | 6/2022 | Crabtree | G06F 16/951 |
| 2022/0224723 | A1* | 7/2022 | Crabtree | H04L 63/20 |
| 2022/0407891 | A1* | 12/2022 | Albanese | H04L 63/205 |
| 2023/0072859 | A1 | 3/2023 | Sugarbaker et al. | |
| 2023/0132703 | A1* | 5/2023 | Marsenic | H04L 63/1433 726/25 |
| 2023/0135660 | A1* | 5/2023 | Chapman | G06Q 10/063114 705/7.38 |
| 2023/0205891 | A1* | 6/2023 | Yellapragada | H04L 63/1433 726/25 |
| 2023/0208870 | A1* | 6/2023 | Yellapragada | H04L 63/20 726/22 |
| 2023/0208871 | A1* | 6/2023 | Yellapragada | G06N 3/045 726/25 |
| 2023/0275909 | A1* | 8/2023 | Shivamoggi | H04L 63/1441 726/23 |
| 2023/0336581 | A1* | 10/2023 | Dunn | G06F 21/577 |
| 2023/0370490 | A1* | 11/2023 | Crabtree | H04L 63/1433 |
| 2023/0370491 | A1* | 11/2023 | Crabtree | G06N 3/098 |
| 2023/0396641 | A1* | 12/2023 | Hebbagodi | H04L 63/1408 |
| 2024/0031391 | A1* | 1/2024 | Baikalov | H04L 63/145 |
| 2024/0195841 | A1* | 6/2024 | Crabtree | G06F 16/951 |
| 2024/0220304 | A1* | 7/2024 | Boyer | H04L 63/1425 |
| 2024/0241752 | A1* | 7/2024 | Crabtree | G06Q 10/067 |
| 2024/0265112 | A1* | 8/2024 | Napper | G06F 9/451 |
| 2024/0265113 | A1* | 8/2024 | Napper | G06F 21/552 |
| 2024/0267400 | A1* | 8/2024 | Gazit | H04L 63/1433 |
| 2024/0354420 | A1* | 10/2024 | Seck | H04L 63/20 |
| 2024/0406145 | A1* | 12/2024 | Crabtree | H04L 9/0894 |
| 2025/0023887 | A1* | 1/2025 | Bosch | H04L 63/1416 |
| 2025/0097252 | A1* | 3/2025 | Salarian | H04L 63/1433 |

OTHER PUBLICATIONS

Roy Maor, "Technical Deep Dive of Cloud Environment Graphs and Attack Paths," retrived at https://securityboulevard.com/2023/01/technical-deep-dive-of-cloud-environment-graphs-and-attack-paths/, Security Boulevard, Jan. 9, 2023.

* cited by examiner

DYNAMIC PRIORITIZATION OF ATTACK PATHS IN CLOUD NATIVE APPLICATION

TECHNICAL FIELD

The present disclosure relates generally to using real-time metrics of data and application flows, access patterns, and telemetry information to dynamically prioritize attack paths identified during a static analysis of a cloud native application. Additionally, top priority attack paths that are identified during the static analysis are utilized to steer the dynamic analysis.

BACKGROUND

Today's networking evolution is moving enterprise applications from data centers to the cloud. This digital transformation is helping enterprise organizations rapidly drive efficiency, agility, and connectivity as they use technology to transform their processes into something easier, faster, more secure, and more flexible. Cloud computing is the new cornerstone to digital transformation. Cloud native applications are programs designed for this cloud computing architecture. A cloud native application is run and hosted in the cloud and advantageously designed for the inherent characteristics of a cloud computing software delivery model. Cloud native applications use a microservice architecture where a large application is designed as a collection of modular components or services. These modules communicate with one another via application program interfaces (APIs). The microservices that make up the cloud native application are packaged in containers, a type of software that can isolate the application enabling it to run independent of physical resources and keeping the microservices from interfering with one another.

In cloud native application security, automatic attack path analysis (AAPA) may be used to examine an asset graph that represents the relationships between the various components of the application and its infrastructure to find pathways through the asset graph that would allow attackers to gain control or reach sensitive resources within the application. As a static approach, AAPA examines the inherent weaknesses in the system through its configuration and security characteristics in view of the possible ways an attacker could exploit the vulnerabilities in the application and/or its environment. The large number of components present in a modern cloud native application, along with the vast number of vulnerabilities that may exist, can require AAPA to go through a significant amount of fine tuning to be useful. On one hand, AAPA techniques can be prone to produce many false positives, especially when they loosely interpret whether a vulnerability can be exploited (e.g., when several of the attack paths (Aps) identified by AAPA will not be exploitable in the real world). On the other hand, techniques that require significant details to match whether a vulnerability can be exploited can miss feasible paths when an attacker slightly modifies the technique used to exploit such vulnerabilities. The result is that false positives in AAPA not only produce alert fatigue in operators but also reduce the confidence in the security analysis results, thereby burying the critical and feasible Aps present in the system under noise. At the same time, false negatives result in ineffective security leading to major impacts for customers and no confidence in the security analysis results.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
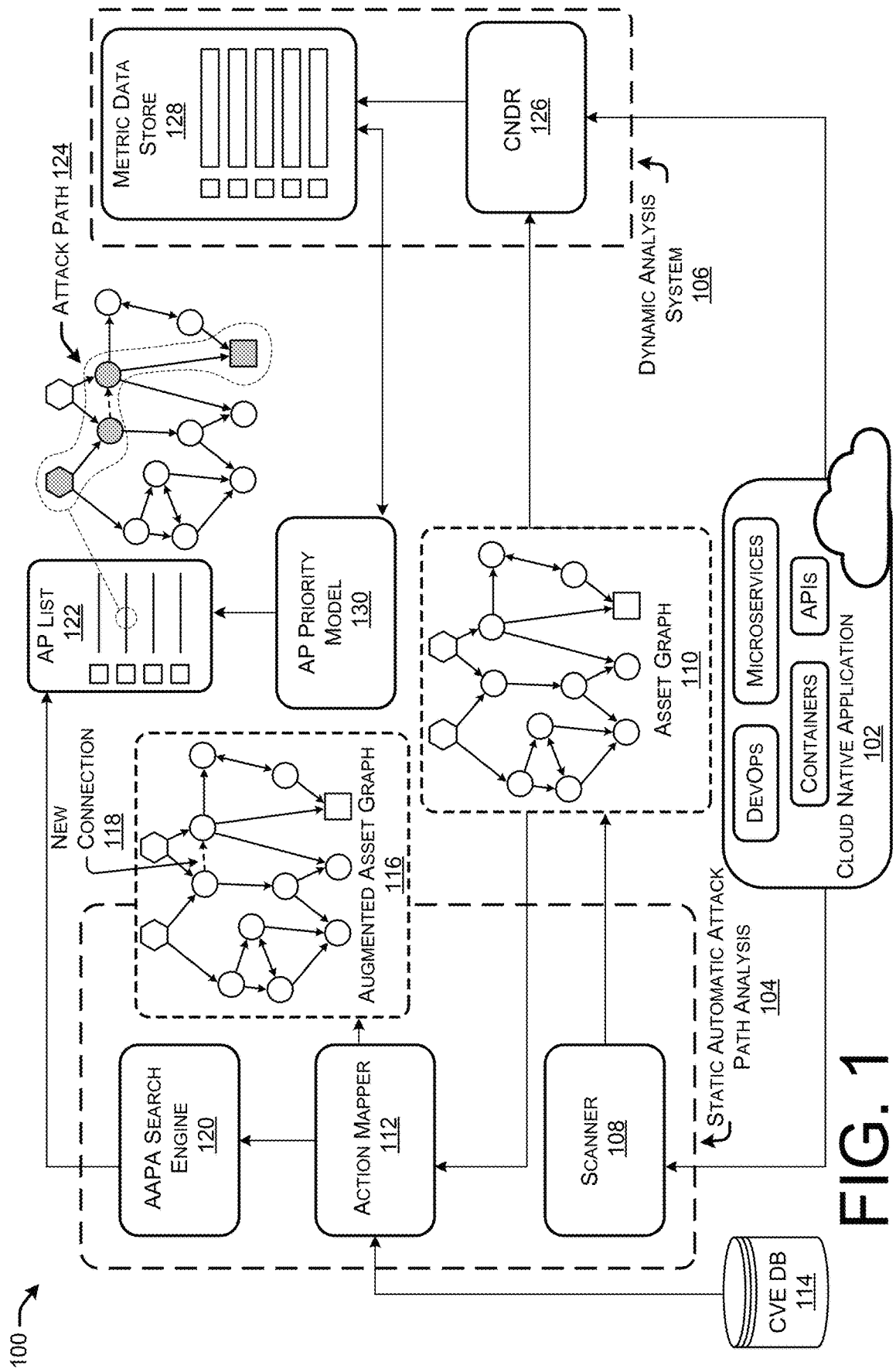
FIG. 1 illustrates an example environment that may implement various aspects of the technologies directed to using real-time metrics of data and applications flows, access patterns, and telemetry information to dynamically prioritize attack paths identified during a static analysis of a cloud native application, and using top priority attack paths identified during the static analysis to steer the dynamic analysis.

This disclosure describes method(s) for prioritizing attack paths in a cloud native application. The method includes identifying components of the cloud native application and connections between the components. In addition, the method includes analyzing at least the components and connections of the cloud native application to identify a set of attack paths that are security vulnerabilities for the cloud native application. The method also includes monitoring network communications in the connections between the components. Additionally, the method includes, collecting, based at least in part on the monitoring of the connections, metrics representing signals in the network communications that indicate real-time security vulnerabilities. The method also includes identifying a first subset of the attack paths based at least in part on a first portion of the metrics corresponding to the first subset of attach paths indicating real-time security vulnerabilities. Finally, the method includes prioritizing the first subset of the attack paths over a second subset of the attack paths based at least in part on the first subset of the attack paths having a first portion of the metrics indicating real-time security vulnerabilities.

Additionally, the techniques described herein may be performed by a system and/or device having non-transitory computer-readable media storing computer-executable instructions that, when executed by one or more processors, performs the method described above.

Example Embodiments

With the proliferation of cloud native applications, cloud native application security is of utmost importance. One way to approach security is automatic attack path analysis (AAPA). AAPA techniques usually consist of an algorithmic approach to examine an asset graph that represents the relationships between software and services, the configuration of the network and various components, software bill of materials, accounts, roles, and user access rights together with databases of known vulnerabilities. The goal of AAPA is to find pathways through the asset graph of the cloud native application that would allow attackers to gain control or reach sensitive resources within the system, i.e., to create an impact. These pathways could exist either due to poor configuration of the application, a set of vulnerabilities that can be leveraged to alter the normal behavior of the application or its components, or both.

AAPA is of static nature as it examines the inherent weaknesses in the system through its configuration and security characteristics (e.g., overprivileged accounts and known vulnerabilities present in the software) in view of the possible ways an attacker can exploit the vulnerabilities in the application and/or its environment. Even such static analysis is challenging. The number of ways that a software component could respond to legitimate inputs or to intentionally malformed ones is large, and priori, unknown. Moreover, security reports associated with vulnerabilities disclosures are often focused on describing how to activate a vulnerability rather than on its consequences.

A major challenge for AAPA is the combinatorial explosion of interactions between components in the application, the various ways they could connect considering the network topology, the effects of the known vulnerabilities on the behavior of the components and their respective subcomponents. However, not all these combinations are feasible and not all connections between components are in practice reachable in the software during operation. As described above, AAPA techniques are prone to produce many false positives, especially when they loosely interpret whether a vulnerability can be exploited, for example, when several of the attack paths (APs) identified by AAPA will not be exploitable in the real world. This results in alert fatigue and reduced confidence in the security analysis results and buries the critical and feasible APs present in the application under noise. Additionally, false negatives result in ineffective security leading to major impacts for customers and no confidence in the security analysis results. A key feature to improve AAPA analysis and reduce the undesired effects of false positive, is to prioritize the discovered APs. Prioritization, however, is challenging due to the incomplete knowledge about the action space of software components and the consequences of vulnerabilities.

Additionally, during the operation of the cloud native application at run-time, cloud native detection and response (CNDR) techniques may collect and monitor a plurality of signals that may include network communication between the components of the cloud native application, the API calls, their authorization tokens and payloads, file access patterns, activation of containers, cluster management events, and the like. Furthermore, CNDR techniques may further include real-time detection of installation of new software components in containers (e.g., a mongoDB client, a python interpreter, a new library, etc.), which is a common pattern in many attacks, as in practice, many containers are not properly hardened, or best practices are not followed. CNDR techniques may also include remote attestation of run-time environments, including the collection of measurements from an App (code execution) as well as from the App code base installed (e.g., to detect that the code base has suddenly been augmented), detection of unconventional communications with external entities (e.g., with an external Lightweight Directory Access Protocol (LDAP) server), for installation of software, reaching an unknown entity including internally spawned ones not preceded by an external request, and the like.

This disclosure describes techniques for dynamically prioritizing the APs discovered by AAPA, by combining the AAPA static analysis with real-time analysis. A static analysis of a cloud native application is combined with dynamic monitoring of the network, data, and application flows in the system collected by CNDR. The rich set of information collected by CNDR can help to prioritize APs in several ways, including reducing the priority of APs that rely on a chain of events that have never been observed before, effectively eliminating those that are practically unreachable, and elevating and flagging a chain of events detected that are partially present in one or more APs that were discovered during the static attack path analysis. This may significantly decrease the false-positive rate of the AAPA and at the same time, significantly boost what a CDNR system could detect by giving the CNDR system the ability to search for specific events, knowing the possible APs in the system. Furthermore, CNDR findings could help complement what scanners can do when building an asset graph, by augmenting the interconnection between the nodes of an application in situations where a scanner does not correctly identify all the valid network connections either by overstating or understating the connections.

Two key data structures utilized to implement the techniques described herein are an AP list and a metric-store. The AP list is essentially a list containing all the possible APs discovered during an automatic attack path analysis, the static analysis of the cloud native application. The metric store collects all the corresponding signals detected and reported by CNDR during the dynamic monitoring of the network, data, and application flows in the system.

During the static attack path analysis of a cloud native application, a scanner creates an asset graph representing the system components and their inter-relationships. The scanner consists of a plurality of tools that extract software bill of materials, discover and classify the various services in the application, discover the connectivity and network configurations, and find and categorize the roles and users. Additionally, an action mapper may augment the asset graph created by the scanner using information known and publicly published in a plurality of external datastores. Examples may include, a Common Vulnerabilities and Exposures (CVE) database, a Common Weakness Enumeration (CWE) directory, Common Attack Pattern Enumeration and Classification (CAPEC) findings, Open Web Application Security Project X (OWASP) findings with X being all sets of vulnerabilities categorized by OWASP, and the like. The augmentation process may add new connections between components of the cloud native application as a consequence of the presence of a vulnerability in the system. Finally, an AAPA search engine may use the augmented asset graph to look for possible attack paths in the cloud native application. In some embodiments, the AAPA search engine presents the APs discovered in a list of discovered APs.

In some example, the static attack path analysis may be an exhaustive search of all conceivable interactions between components of the cloud native application. In other examples, the static AAPA may be narrowed to focus on identifying attack paths that are based on high priority vulnerabilities, or high priority components. In still another example, an enterprise organization may limit the static attack path analysis based on customized priorities of the organization.

During dynamic analysis of the cloud native application, a CNDR monitors the connections between components of the application and continuously updates a plurality of metrics associated with activations of these connections in a metric store. The metrics in the metric store are used by an attack path priority model to determine a probabilistic estimate of the ranking, or prioritizing, of the attack paths. In some examples, a plurality of other metadata associated with the attack paths are also used along with the metrics collected by the CNDR, to help prioritize the APs in the AP list. In some instances, the priority model may be a machine learning (ML) model that has been trained on a large ensemble of applications and attack paths. Additionally in some examples, a plurality of ML models may be used to build the priority model, including but not limited to, regression models, gradient-boosted trees, neural networks, support-vector machines, and ensemble methods.

Additionally, during the operation of the system, an update procedure may be performed based on periodic scans and changes to the AP list or based on changes to the metrics collected and stored in the metric store. The update may include changes in signals and metrics collected by the CNDR and stored in the metric store. These changes may result in re-computation of the priority model that ultimately changes the ranking of the APs in the AP list. For example, a first activation of an AP in the AP list that has never been activated before, could potentially indicate the emergence of an on-going attack. Thus, the AP is flagged, and CNDR will further monitor the activity of the application components involved.

By combining the dynamic view of the cloud native application provided by CNDR tools with the static view of attack path analysis, false positives may be reduced in automatic detection of the attack paths by demoting those APs that in practice are not reachable or feasible. In addition, by determining normative connections between components in the cloud native application, the CNDR can detect when connections that have never been traversed before suddenly get activated, raising the priority of any corresponding attack paths. Furthermore, the APs discovered during the static AAPA enable the CNDR to give context to the seemingly random and uncorrelated activities across various components in the system. The CNDR may utilize the APs identified in the static attack path analysis to pin-point on-going attacks on seemingly random and unrelated signals from different components. The dynamic CNDR analysis also allows the detection of connections that are active in runtime, but during the static AAPA analysis were missed. This information may then be used to augment the asset graph with addition of the empirical connections to improve coverage. In turn, APs generated by the static analysis can be used to focus the collection of events in a CNDR where event collection may be resource intensive (e.g., collection of system call traces) to only those locations necessary to detect the relevant APs.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 that may implement various aspects of the technologies directed to using real-time metrics of data and application flows, access patterns, and telemetry information to dynamically prioritize attack paths identified during a static analysis of a cloud native application. Environment 100 includes a cloud native application 102, a static Automatic Attack Path Analysis (AAPA) system 104, and a dynamic analysis system 106. The AAPA represents a static analysis that may be implemented prior to an attack or prior to runtime of the cloud native application 102. The AAPA 104 analyzes the posture of the cloud native application 102 and its environment. The AAPA 104 is a combination of systems that identifies components of the cloud native application 102, connections between the components, analyzes the components and the connections, and identifies a set of attack paths that may be security vulnerabilities for the cloud native application 102. The example AAPA 104 includes a scanner 108 that may create an asset graph 110 representing the cloud native application 102 components and their inter-relationships. The asset graph 110 may illustrate the components of the cloud native application 102 and how they are connected. The scanner 108 may include a plurality of tools that extract software bill of materials, discover and classify the various services in the cloud native application 102, discover the connectivity and network configurations, and find and categorize the roles and users.

The AAPA 104 also includes an action mapper 112. The action mapper 112 may augment the asset graph 110 using information available from external sources that publicly publish known vulnerabilities. For example, environment 100 illustrates the action mapper 112 receiving information including known vulnerabilities related to the cloud native application from CVE database 114. The action mapper 112 may also receive vulnerability information from a CWE directory, CAPEC findings, OWASP findings, and any other external source that may include vulnerability information known and publicly published. In example environment 100, the action mapper 112 augments the asset graph 110 to create augmented asset graph 116. The augmentation process has added new connection 118 as a consequence of the presence of a vulnerability in the cloud native application.

In example environment 100, the AAPA 104 also includes an AAPA search engine 120. The AAPA search engine may use the augmented asset graph 116 to look for possible attack paths in the cloud native application 102. The AAPA search engine 120 identifies how the augmented asset graph 116 may be traversed from entry points into the system to sensitive assets (e.g., data, resources, roles, etc.). Essentially, the AAPA search engine 120 attempts to identify all the ways an attacker might be able to traverse the system to access sensitive information or resources. In some embodiments, the AAPA search engine 120 might identify only a subset of all attack path, by only considering vulnerabilities that are known to be exploitable or have high severity. The severity or exploitability of a vulnerability might be decided based on metrics such as CVSS (Common Vulnerability Scoring System) or other metrics. In some embodiments the AAPA search engine 120 may present the identified APs in an AP list 122. The AP list 122 may list all attack paths identified by the AAPA search engine 120, for example, attack path 124.

Static automatic attack path analysis as described above may identify the various ways that components within the cloud native application system could connect considering the network topology, the effects of the known vulnerabilities on the behavior of the components and their respective sub-components. However, AAPA is computationally resource intensive and not all combinations are feasible and not all connections between components are in practice reachable in the software during operation. Techniques described here for using real-time metric of the data and application flows, access patterns and telemetry information to dynamically prioritize the attack paths identified during the static AAPA analysis, may alleviate this issue.

The example dynamic analysis system 106 illustrated in environment 100 represents a dynamic analysis of the cloud native application 102. The dynamic analysis system 106 monitors the cloud native application 102 in real-time looking for abnormalities that may indicate a real-time security vulnerability or attack in progress. The dynamic analysis system includes a Cloud Native Detect and Response (CNDR) 126 that monitors the pathways or connections between components of the cloud native application 102 that are represented in the augmented asset graph 116. The CNDR 126 then collects and stores a plurality of metrics associated with activations of the connections between components of the cloud native application 102 in a metric data store 128 (e.g., data traffic logs, telemetry information, etc.). The CNDR 126 continuously monitors the cloud native application 102, collecting and updating associated metrics in the metric data store 128. The metrics stored in the metric data store 128 are used by the attack path priority model 130 to come up with a probabilistic estimate of a ranking of the attack paths. Essentially, the AP priority model 130 combines the static cloud native application analysis that may determine potential attack paths with the dynamic cloud native application analysis that can detect abnormalities that may indicate attack in progress, to prioritize the list of attack paths. As an example, a calculated attack from an external bad actor may ultimately take around 50 days to complete. The attacker may find an entry into the system, and in order to reach the sensitive components of the system that is their goal, multiple lateral moves over many days within the system may be necessary to find a combination of connections that ultimately leads to the attacker's goal. When the dynamic analysis system 106 observes an abnormality in real-time (during the 50 days of the attack), the AP priority model 130 can reprioritize the list of attack paths based on this new observation.

In some embodiments, the AP priority model 130 is a machine learning (ML) model trained on a large ensemble of applications and attack paths. In some examples, a plurality of ML models may be used to build the AP priority model 130. For example, a plurality of ML models may include but are not limited to regression models, gradient-boosted trees, neural networks, support-vector machines and ensemble methods. As the CNDR 126 continually collects and stores metrics in the metric data store 128, the AP priority model 130 may continually update and reprioritize the APs in the AP list 122.

Figure 2:
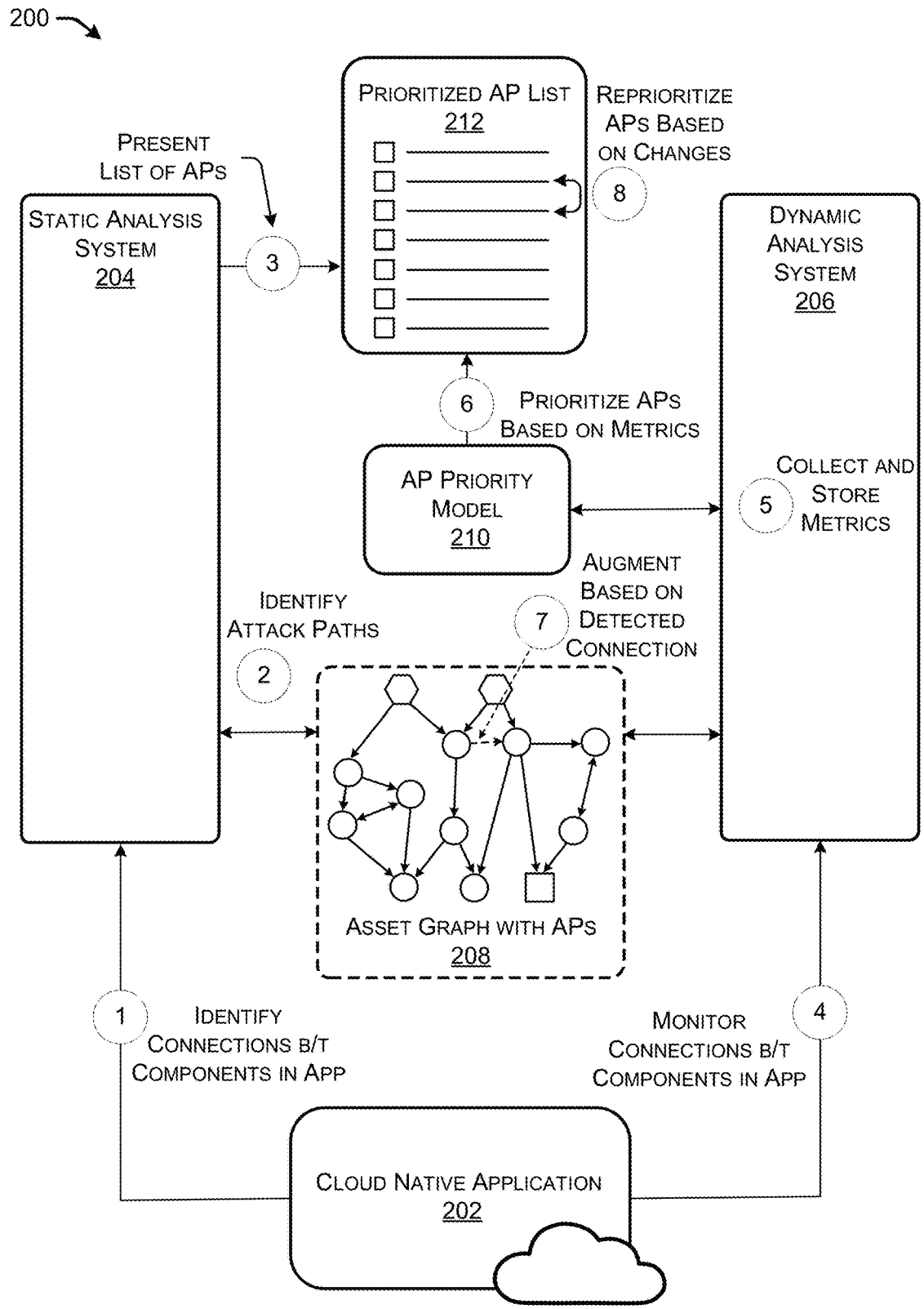
FIG. 2 illustrates an example environment that may implement various aspects of the technologies directed to prioritizing (or reprioritizing) attack paths based on a static attack path analysis combined with a dynamic analysis of a cloud native application.

FIG. 2 illustrates an example environment 200 that may implement various aspects of the technologies directed to using real-time metrics of data and application flows, access patterns, and telemetry information to dynamically prioritize attack paths identified during a static analysis of a cloud native application. Environment 200 is similar to the example environment 100 of FIG. 1, however example environment 200 illustrates less detail indicating how a static analysis of the cloud native application and a dynamic analysis of the cloud native application are accomplished and more detail regarding the how an AP priority model uses the information from each analysis to prioritize attack paths for a cloud native application.

Environment 200 includes a cloud native application 202, a static analysis system 204, and a dynamic analysis system 206. The static analysis system may be implemented prior to an attack or prior to runtime of the cloud native application 202. The static analysis system is a combination of systems that, at (1) identify components of the cloud native application 202 and connections between the components. At (2) the static analysis system 204 analyzes the components and connections and identifies a set of attack paths that may be security vulnerabilities for the cloud native application 202. The attack paths may be represented in asset graph with the APs 208, for example. The static analysis system 204 may identify the various ways that components within the cloud native application system may connect considering the network topology, the effects of the known vulnerabilities on the behavior of the components and their respective sub-components and present a list of APs at (3). The list of APs presented at (3) may by prioritized only based on the analysis of the static analysis system 204 may or may not represent an optimal prioritization of the attack paths.

The dynamic analysis system 206 monitors the cloud native application 202 in real-time looking for any abnormalities that may indicate a real-time security vulnerability or attack in progress. At (4) the dynamic analysis system 206 monitors the components and the pathways or connections between components of the cloud native application 202. At (5) the dynamic analysis system collects a plurality of metrics associated with the components and the activations of the connections between components of the cloud native application 202, and stores the metrics for analysis. The dynamic analysis system 206 continuously, or periodically, monitors the cloud native application 202 components and connections, and may update and store metrics as changes (e.g., a new connection activation) are observed.

Environment 200 also includes an AP priority model 210. At (6) the AP priority model 210 combines the information produced by both the static analysis system 204 and the dynamic analysis system 206 to prioritize APs in the cloud native application 202. The AP priority model 210 may analyze the metric collected and stored at (5) and based on the metrics, or changing metric, the AP priority model 210 prioritized the APs that were presented at (3). In some implementations, the AP priority model 210 is a machine learning (ML) model trained on a large ensemble of applications and attack paths. In some examples, a plurality of ML models may be used to build the AP priority model 210. For example, a plurality of ML models may include but are not limited to regression models, gradient-boosted trees, neural networks, support-vector machines and ensemble methods.

Furthermore, in some examples, the dynamic analysis system 206 may help complement the static analysis system 204 when building an asset graph, by augmenting the interconnection between the nodes of a cloud native application in situations where the static analysis does not correctly identify all the valid network connections either as illustrated in FIG. 2. At (7). Additionally, as the dynamic analysis system 206 continually collects and stores metrics, the AP priority model 210 may continually update and reprioritize the APs in the AP list 212 a shown at (8).

Figure 3:
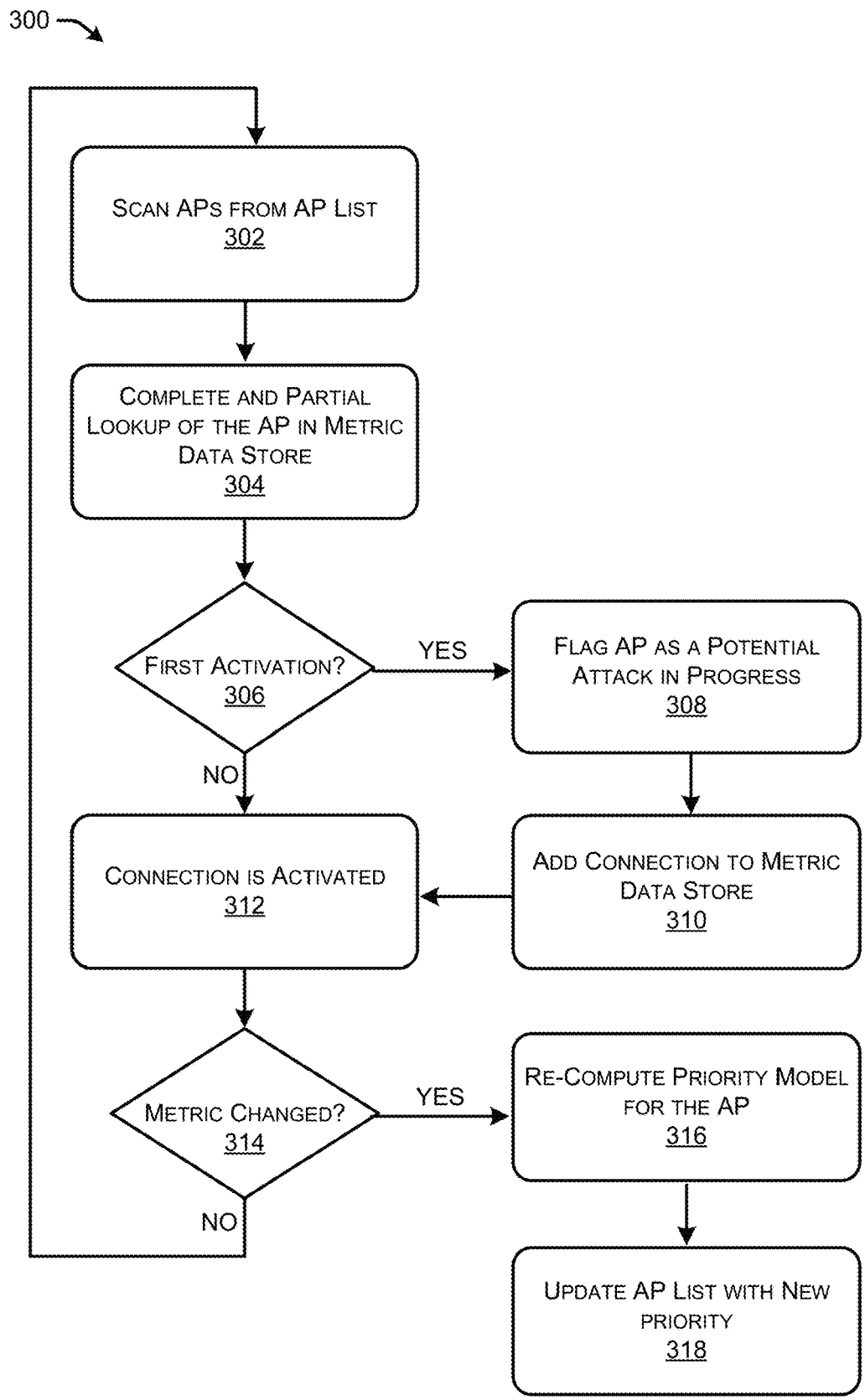
FIG. 3 is a flow diagram illustrating an example method associated with the techniques described herein for re-computing the priority of attack paths based on a first activation of a connection between components of a cloud native application.

FIG. 3 is a flow diagram illustrating an example method 300 associated with techniques described herein for reprioritizing attack paths for a cloud native application when a connection is activated that has not been activated before. Example method 300 illustrates aspects of the functions performed by the static automatic attack path analysis system 104, the dynamic analysis system 106 and the AP priority model 130 as described in FIG. 1. The logical operations described herein with respect to FIG. 3 may be implemented (1) as a sequence of computer-implemented acts or program modules running on a computing system and/or (2) as interconnected machine logic circuits or circuit modules within the computing system. In some examples, the method(s) 300 may be performed by a system comprising one or more processors and one or more non-transitory computer-readable media storing computer-executable instructions that, when executed by the one or more processors, cause the one or more processors to perform the method(s) 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components At operation 302 the attack paths included in the AP list are scanned. For example, with reference to FIG. 1, the CNDR 126 may scan the APs in the AP list 122. The APs may be scanned by the CNDR 126 on a periodic basis. Alternately or in addition, a scan may be triggered based on a change (e.g., a new APs is added) in the AP list 122, or based on changes of the metrics in the metric data store 128.

At operation 304 the APs that are scanned at operation 302, the newly collected metrics may be compared to the metrics for the APs previously stored in the metric data store. Referring again to FIG. 1, once the CNDR 126 completes a periodic scan of an AP for the AP list 122, newly collected metric from the scan may be compared to the metrics for the AP currently stored in the metric data store 128. For example, the CNDR 126 may scan attack path 124 listed in the AP listed 122. Once the CNDR 126 has scanned attack path 124 and collected the metrics, the newly collected metrics may be compared to the metrics currently stored in the metric data store 128.

At operation 306 a determination is made whether a first activation of a connection in an attack path has been observed. For example, in FIG. 1 the newly collected metrics for attack path 124 and the currently stored metrics for attack path 124 are compared and a determination is made whether a first activation of one or more connections in attack path 124 is present in the newly collected metrics.

At operation 308 if it is determined in operation 306 that a first activation of a connection between components in the cloud native application has occurred, the attack path is flagged as a potential attack in progress. For example, with reference to FIG. 1 if the dotted connection in attack path 124 is determined to be a first activation in the AP, attack path 124 may be flagged as a potential attack in progress.

At operation 310 if the activation is determined to be a first activation, once it is flagged as a potential attack in progress, the metric data store is updated with the information that the connection has been activated. For example, in FIG. 1 the newly collected data indicating that the dotted connection in attack path 124 is stored in the metric data store 128 as an activated connection.

At operation 312 whether the connection is newly activated or has been activated previously, the connection is now an activated connection.

At operation 314 a determination whether the metric has changed or not is made. For example, if it was determined at operation 306 that a first activation of a connection occurred, the metric has changed. However, if a first activation has not occurred (the connection has been activated in the past) the metric has not changed. If the metric has not changed, the method may return to operation 302 when a periodic scan of APs from the AP list is set to occur.

If at operation 314 a determination is made that the metric has changed (e.g., a first activation of a connection has occurred), at operation 316 a prioritization of the AP list may be re-computed. For example, with reference to FIG. 2, the attack paths in the prioritized attack path list may be reprioritized by the AP priority model 210 as shown at (8). Finally, at operation 318 the AP list is updated with the new priority. For example, in FIG. 2 the prioritized AP list 212 is updated and reprioritized based on the changes in metrics. For instance, the priority of an individual attack path in the prioritized AP list 212 may be reduced when the attack path relies on a chain of events that has not previously been observed. In contrast, the priority of an individual attack path in the prioritized AP list 212 may increase when the attack path relies on a chain of events that is observed to be at least partially present on the connections between components by the dynamic analysis system 206 as the dynamic analysis system 206 monitors the components and connection between components of the cloud native application 202.

Figure 4:
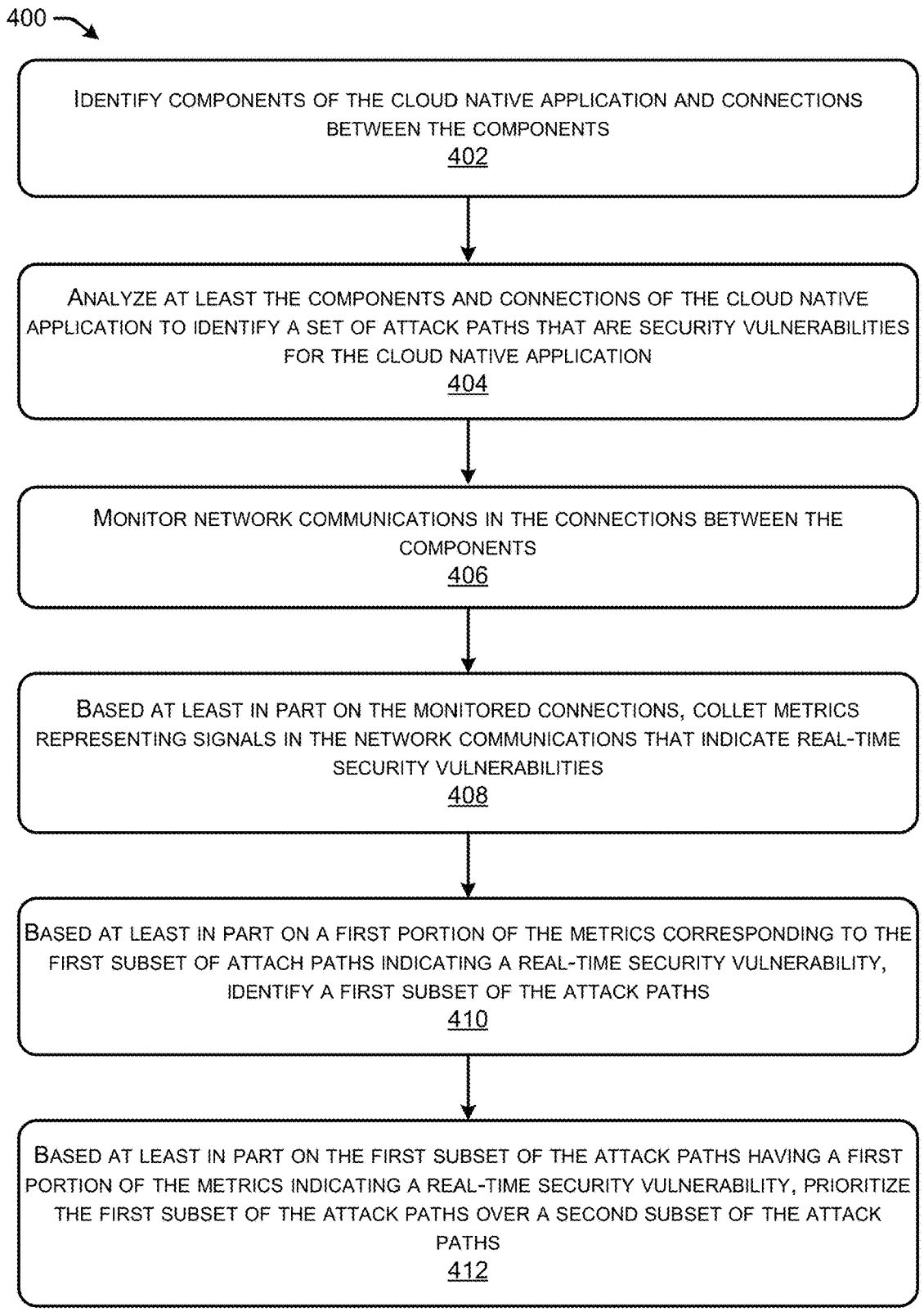
FIG. 4 is a flow diagram illustrating an example method associated with the techniques described herein for using real-time metrics of data and application flows, access patterns, and telemetry information to dynamically prioritize attack paths identified during a static analysis of a cloud native application.

FIG. 4 is a flow diagram illustrating an example method 400 associated with techniques described herein for reprioritizing attack paths for a cloud native application when a connection is activated that has not been activated before. Example method 400 illustrates aspects of the functions performed by the static automatic attack path analysis system 104, the dynamic analysis system 106 and the AP priority model 130 as described in FIG. 1, and the static analysis system 204, the dynamic analysis system 206, and the AP priority model 210 as described in FIG. 2. The logical operations described herein with respect to FIG. 4 may be implemented (1) as a sequence of computer-implemented acts or program modules running on a computing system and/or (2) as interconnected machine logic circuits or circuit modules within the computing system. In some examples, the method(s) 400 may be performed by a system comprising one or more processors and one or more non-transitory computer-readable media storing computer-executable instructions that, when executed by the one or more processors, cause the one or more processors to perform the method(s) 400.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 402, components of a cloud native application and the connections between the components are identified. For example, with reference to FIG. 2, the static analysis system 204 identifies components and the connections between components of the cloud native application 202 at (1).

At operation 404, at least the components and connections of the cloud native application are analyzed to identify a set of attack paths that are security vulnerabilities for the cloud native application. Referring again to FIG. 2, at (2) attack paths are identified and an asset graph representing the identified attack paths may be created. At (3) the identified attack paths may be presented as a list of identified attack paths.

At operation 406, network communications in the connections between the components are monitored. For example, with reference to FIG. 2 and at (4) the dynamic analysis system 206 monitors the components and the connections between the components of the cloud native application 202.

At operation 408, based at least in part on the monitored connections, metric representing signals in the network communication are collected that indicate real-time security vulnerabilities. For example, in FIG. 2 at (5) the dynamic analysis system 206 collects and stores metrics associated with the components and connections between components of the cloud native application 202 that result from the monitoring occurring at operation (4).

At operation 410, a first subset of the attack paths is identified based at least in part on a first portion of the metric corresponding to the first subset of attack paths indicating a real-time security vulnerability. For example, with reference to FIG. 2 the dynamic analysis system 206 analyzes the metrics collected and stored from operation (5) and may identify one or more attack paths that having a first portion of the metrics that indicate a real-time security vulnerability.

At operation 412, the first subset of the attack paths is prioritized over a second subset of the attack paths based at least in part on the first subset of the attack paths having a first portion of the metrics indicating a real-time security vulnerability. For example, in FIG. 2 at (6) the AP priority model 210 can prioritize the attack paths based on the metrics. In addition, as new metrics are continuously or periodically collected, the AP priority model 210 may reprioritize the attack paths based on new or changing metrics as shown at (8).

Figure 5:
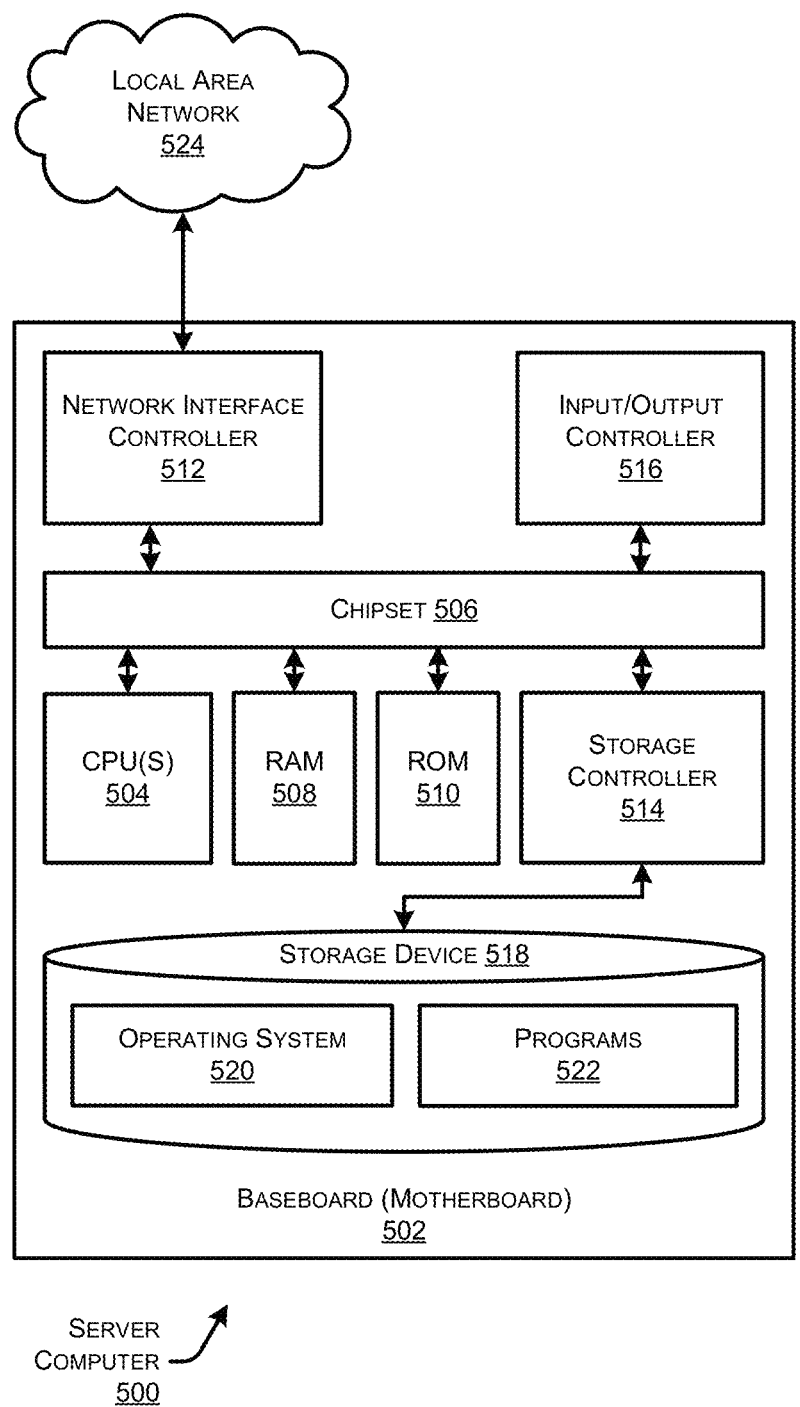
FIG. 5 is a computer architecture diagram showing an illustrative computer hardware architecture for implementing a server device that can be utilized to implement aspects of the various technologies presented herein.

FIG. 5 shows an example computer architecture for a computing device (or network routing device) 500 capable of executing program components for implementing the functionality described above. The computer architecture shown in FIG. 5 illustrates a conventional server computer, workstation, desktop computer, laptop, tablet, network appliance, e-reader, smartphone, or other computing device, and can be utilized to execute any of the software components presented herein. The computing device 500 may, in some examples, correspond to the AP priority model 130, any of the devices included in the static automatic attack path analysis system 104, and any of the devices included in the dynamic analysis system 106 or FIG. 1.

The computing device 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 500. The chipset 506 can further provide an interface to a computer-readable storage medium such as a read-only memory ("ROM") 510 or non-volatile RAM ("NVRAM") for storing basic routines that help to startup the computing device 500 and to transfer information between the various components and devices. The ROM 510 or NVRAM can also store other software components necessary for the operation of the computing device 500 in accordance with the configurations described herein.

The computing device 500 can operate in a networked environment using logical connections to remote computing devices and computer systems through a network, such as the network 524. The chipset 506 can include functionality for providing network connectivity through a NIC 512, such as a gigabit Ethernet adapter. The NIC 512 is capable of connecting the computing device 500 to other computing devices over the network 524. It should be appreciated that multiple NICs 512 can be present in the computing device 500, connecting the computer to other types of networks and remote computer systems.

The computing device 500 can be connected to a storage device 518 that provides non-volatile storage for the computing device 500. The storage device 518 can store an operating system 520, programs 522, and data, which have been described in greater detail herein. The storage device 518 can be connected to the computing device 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 can further read information from the storage device 518 by detecting the physical states or characteristics of one or more particular locations within the physical storage units.

In addition to the mass storage device 518 described above, the computing device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 500. In some examples, the operations performed by the network device(s) 102-108, and or any components included therein, may be supported by one or more devices similar to computing device 500. Stated otherwise, some or all of the operations performed by the network device(s) 102-108, and or any components included therein, may be performed by one or more computing device 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 500.

In one embodiment, the storage device 518 or other computer-readable storage media is encoded with computer-executable instructions which, when loaded into the computing device 500, transform the computer from a general-purpose computing system into a special-purpose computer capable of implementing the embodiments described herein. These computer-executable instructions transform the computing device 500 by specifying how the CPUs 504 transition between states, as described above. According to one embodiment, the computing device 500 has access to computer-readable storage media storing computer-executable instructions which, when executed by the computing device 500, perform the various processes described above with regard to FIG. 3. The computing device 500 can also include computer-readable storage media having instructions stored thereupon for performing any of the other computer-implemented operations described herein.

The computing device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 500 might not include all of the components shown in FIG. 5, can include other components that are not explicitly shown in FIG. 5, or might utilize an architecture completely different than that shown in FIG. 5.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    identifying components of a cloud native application and connections between the components;
    analyzing at least the components and connections of the cloud native application to identify attack paths that are security vulnerabilities for the cloud native application;
    monitoring network communications in the connections between the components;
    collecting, based at least in part on the monitoring of the connections, metrics representing signals in the network communications that indicate real-time security vulnerabilities;
    increasing a priority of a first subset of the attack paths based at least in part on metrics associated with the first subset of the attack paths indicating a real-time security vulnerability; and
    reducing a priority of a second subset of attack paths based at least in part on metrics associated with the second subset of attack paths indicating an absence of a real-time security vulnerability.

2. The method of claim 1, further comprising;
    detecting a first activation of signals on a connection between a first component and a second component of the cloud native application;
    flagging the connection between the first component and the second component as a potential attack in progress; and
    adding the connection between the first component and the second component to a collection of metrics as an activated connection.

3. The method of claim 2, further comprising adding the connection between the first component and the second component to the first subset of the attack paths.

4. The method of claim 2, further comprising:
determining that the identified attack paths do not include the connection between the first component and the second component; and
adding the connection between the first component and the second component to the identified attack paths.

5. The method of claim 1, further comprising altering the monitoring of the network communications in the connections between the components based at least in part on a priority of an individual attack path.

6. The method of claim 1, wherein identifying the components of the cloud native application and the connections between the components further comprises receiving information including known security vulnerabilities of the cloud native application from one or more external databases.

7. The method of claim 1, further comprising:
reducing a priority of an individual attack paths that relies on a chain of events that has not previously been observed; and
increasing a priority of an individual attack path that relies on a chain of events that is at least partially present on the connections between the components.

8. A system comprising:
one or more processors; and
one or more computer-readable media storing computer-executable instructions that, when executed by the one or more processors, cause the one or more processors to perform operations comprising:
identifying components of a cloud native application and connections between the components;
analyzing at least the components and connections of the cloud native application to identify attack paths that are security vulnerabilities for the cloud native application;
monitoring network communications in the connections between the components;
collecting, based at least in part on the monitoring of the connections, metrics representing signals in the network communications that indicate real-time security vulnerabilities;
increasing a priority of a first subset of the attack paths based at least in part on metrics associated with the first subset of the attack paths indicating a real-time security vulnerability; and
reducing a priority of a second subset of attack paths based at least in part on metrics associated with the second subset of attack paths indicating an absence of a real-time security vulnerability.

9. The system of claim 8, the operations further comprising:
detecting a first activation of signals on a connection between a first component and a second component of the cloud native application;
flagging the connection between the first component and the second component as a potential attack in progress; and
adding the connection between the first component and the second component to a collection of metrics as an activated connection.

10. The system of claim 9, the operations further comprising adding the connection between the first component and the second component to the first subset of the attack paths.

11. The system of claim 9, the operations further comprising:
determining that the identified attack paths do not include the connection between the first component and the second component; and
adding the connection between the first component and the second component to the identified attack paths.

12. The system of claim 8, wherein the monitoring is based at least in part on connections between the components that have been identified as at least a portion of an attack path during the analyzing.

13. The system of claim 8, wherein identifying the components of the cloud native application and the connections between the components further comprises receiving information including known security vulnerabilities of the cloud native application from one or more external databases.

14. The system of claim 8, the operations further comprising:
reducing a priority of an individual attack paths that relies on a chain of events that has not previously been observed; and
increasing a priority of an individual attack path that relies on a chain of events that is at least partially present on the connections between the components.

15. One or more non-transitory computer-readable media storing instructions that, when executed, cause one or more processors to perform operations comprising:
identifying components of a cloud native application and connections between the components;
analyzing at least the components and connections of the cloud native application to identify attack paths that are security vulnerabilities for the cloud native application;
monitoring network communications in the connections between the components;
collecting, based at least in part on the monitoring of the connections, metrics representing signals in the network communications that indicate real-time security vulnerabilities;
increasing a priority of a first subset of the attack paths based at least in part on metrics associated with the first subset of the attack paths indicating a real-time security vulnerability; and
reducing a priority of a second subset of attack paths based at least in part on metrics associated with the second subset of attack paths indicating an absence of a real-time security vulnerability.

16. The one or more non-transitory computer-readable media of claim 15, the operations further comprising:
detecting a first activation of signals on a connection between a first component and a second component of the cloud native application;
flagging the connection between the first component and the second component as a potential attack in progress; and
adding the connection between the first component and the second component to a collection of metrics as an activated connection.

17. The one or more non-transitory computer-readable media of claim 16, the operations further comprising adding the connection between the first component and the second component to the first subset of the attack paths.

18. The one or more non-transitory computer-readable media of claim 16, the operations further comprising:
determining that the identified attack paths do not include the connection between the first component and the second component; and adding the connection between the first component and the second component to the identified attack paths.

19. The one or more non-transitory computer-readable media of claim 15, the operations further comprising altering the monitoring of the network communications in the connections between the components based at least in part on a priority of an individual attack path.

20. The one or more non-transitory computer-readable media of claim 15, the operations further comprising:
  reducing a priority of an individual attack paths that relies on a chain of events that has not previously been observed; and
  increasing a priority of an individual attack path that relies on a chain of events that is at least partially present on the connections between the components.

* * * * *